Figure 8:
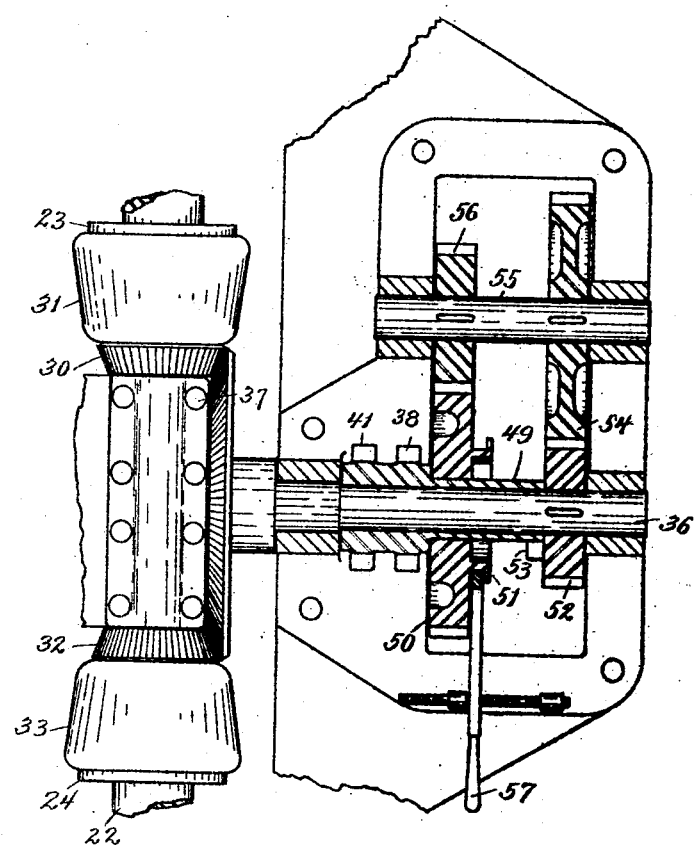

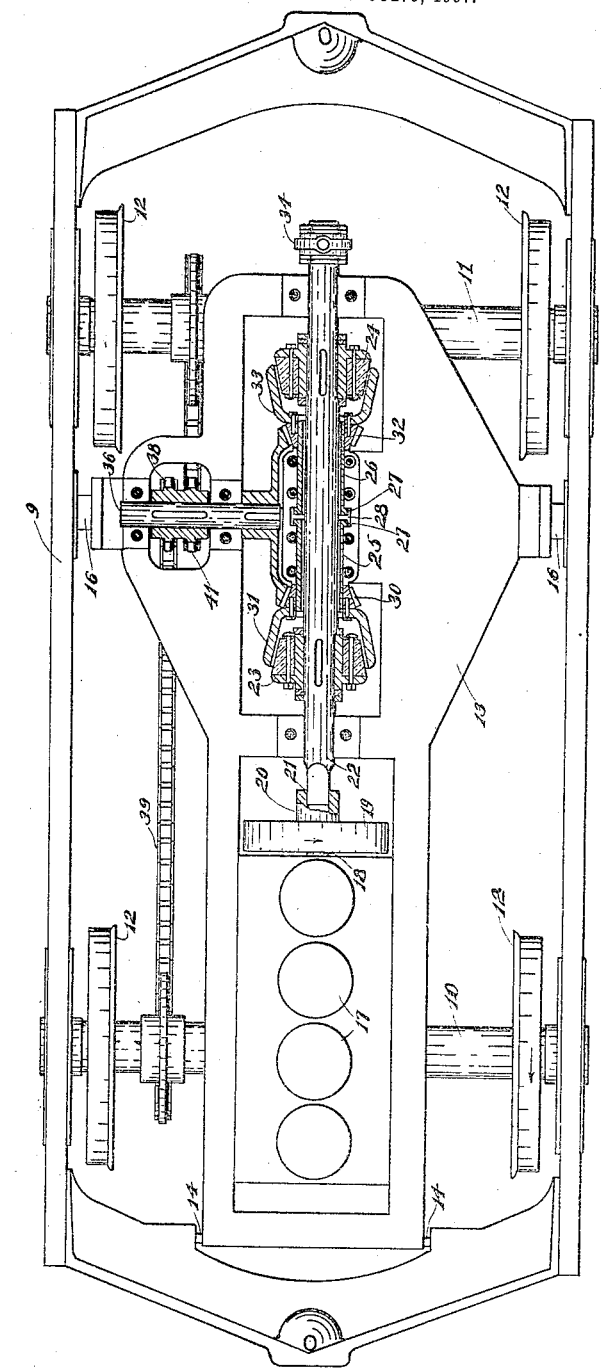

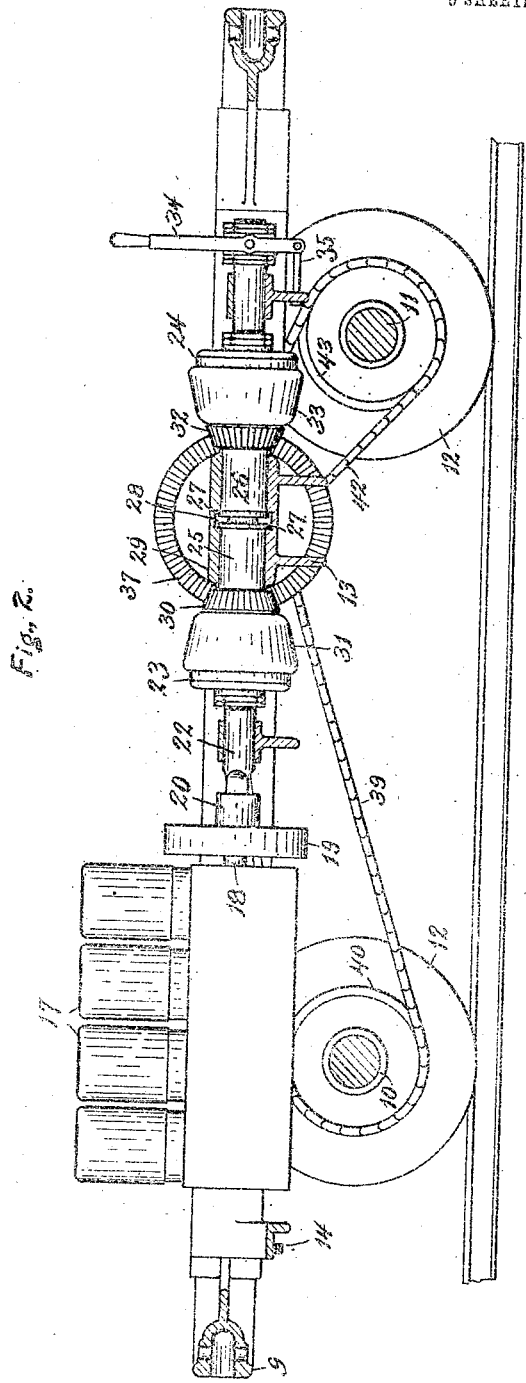

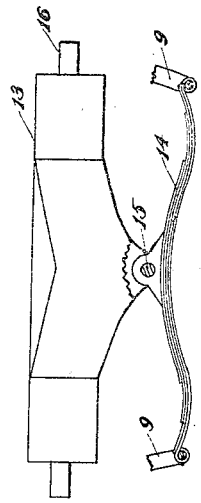
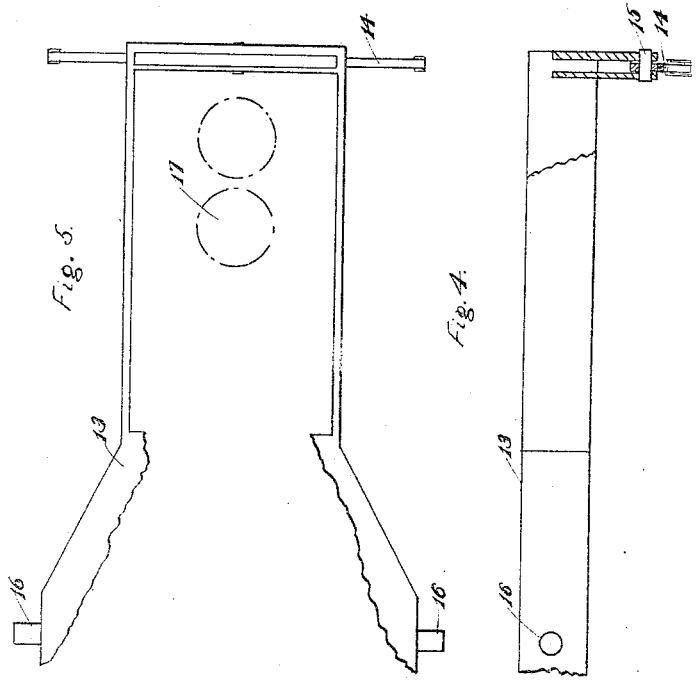

No. 895,843. PATENTED AUG. 11, 1908.
F. P. COOK & A. N. MILLER.
LOCOMOTIVE.
APPLICATION FILED OCT. 3, 1907.
5 SHEETS—SHEET 4.
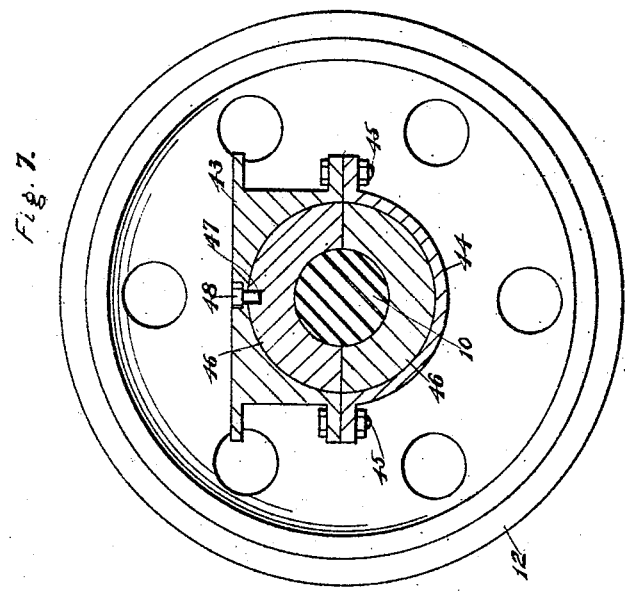
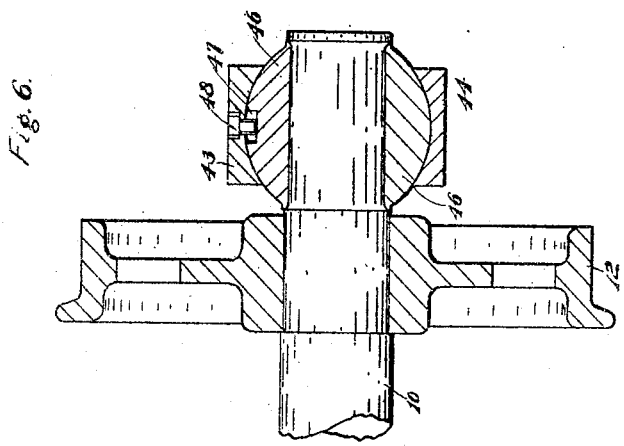

No. 895,843.

PATENTED AUG. 11, 1908.

F. P. COOK & A. N. MILLER.
LOCOMOTIVE.
APPLICATION FILED OCT. 3, 1907.

5 SHEETS—SHEET 5.

Witnesses
Anna F. Schmidtbauer
Alma A. Klug

Inventor
Frederick P. Cook
Adolph N. Miller
By their Attorney
Benedict, Morsell & Caldwell

UNITED STATES PATENT OFFICE.

FREDERICK P. COOK AND ADOLPH N. MILLER, OF MILWAUKEE, WISCONSIN.

LOCOMOTIVE.

No. 895,843.   Specification of Letters Patent.   Patented Aug. 11, 1908.

Application filed October 3, 1907. Serial No. 395,721.

*To all whom it may concern:*

Be it known that we, FREDERICK P. COOK and ADOLPH N. MILLER, residing in Milwaukee, in the county of Milwaukee and State of Wisconsin, have invented new and useful Improvements in Locomotives, of which the following is a description, reference being had to the accompanying drawings, which are a part of this specification.

Our invention has relation to improvements in locomotives, more especially to gasolene locomotives.

One of the important objects of the invention is to provide an improved form of speed reversing mechanism, whereby the locomotive may be run forward at variable speeds, and also run backwards at the same variable speeds.

A further object resides in the improved construction, whereby the frame is suspended from a plurality of movable suspension points, which have the effect of preventing parts of the locomotive from becoming cramped, when the locomotive is traveling over an uneven track.

A further object resides in the arrangement of two of the suspension points in the same center as the chain shaft, whereby the chain is never tightened or loosened notwithstanding movements imparted to the frame by reason of jars or vibration.

A still further object resides in an improved bearing for the car wheels.

With the above primary, and other incidental objects in view, the invention consists of the devices and parts, or their equivalents, as hereinafter set forth.

In the accompanying drawings, Figure 1 is a plan view of the locomotive, parts in section; Fig. 2 is a side view of the locomotive and the connecting mechanism, parts being in section; Fig. 3 is an end view of the supporting frame showing its connection to the spring; Fig. 4 is a fragmentary side view of Fig. 3, parts in section; Fig. 5 is a fragment of the supporting frame, showing the three points of suspension; Fig. 6 is a section through one of the car wheel bearings; Fig. 7 is a section at right angles to Fig. 6, taken through said bearing; and Fig. 8 is a plan view, partly in section, of a modified form of mechanism for changing the speed.

For the purpose of more clearly showing the working parts of the locomotive, the engineer's cab, and other upper portions of an ordinary locomotive, and which form no part of the present invention, are omitted from the drawings.

Referring to the drawings, the numeral 9 indicates the main frame portion, which is advisably of a substantially rectangular shape. Mounted in suitable bearings below the frame are the front and rear axles 10 and 11, having mounted thereon the track wheels 12.

Within the main frame is a supplemental frame 13 for supporting the working parts of the mechanism. This supplemental frame is supported in a novel manner, i. e., is provided with three points of suspension. The front point of suspension is formed by a transverse leaf spring 14 which is pivotally connected at its center by a pin 15 to the central portion of the front of the supporting frame. The ends of the leaf spring are secured to the forward portion of the outer frame 9, as clearly shown in Fig. 3. The two remaining points of suspension are provided at opposite sides of the inner supporting frame 13, and between the ends of said frame, the said two points of suspension being formed by trunnions 16, 16 which enter and are turnable in the sides of the outer frame 9.

The front reduced portion of the supplemental frame supports the cylinder 17 of an ordinary gasolene engine mechanism. The shaft of this engine mechanism is indicated by the numeral 18, and carries the usual fly wheel 19, said fly wheel having its hub projecting rearwardly, as indicated by the numeral 20. This hub portion is provided with a square opening 21 which receives slidably therein the squared forward end of a reversing shaft 22. This shaft is mounted in suitable bearings in the supporting frame 13, and is slidable in said bearings.

Keyed to the shaft 22, and at distances apart thereon, are cone friction wheels 23 and 24. Surrounding the shaft between these friction wheels, but not in contact with said shaft, are sleeve sections 25 and 26. The inner adjacent ends of these sleeve sections are provided with annular shoulders 27, 27 which fit in an annular recess 28 formed in a tubular bearing 29 for said sleeve sections. The forward end of sleeve section 25 is provided with a rigid bevel pinion 30, and in turn rigidly secured to this bevel pinion is a friction cup 31, which is adapted to coöperate with the cone friction 23. The rear end of sleeve section 26 is also provided with a rigid bevel pinion 32, and in turn rigidly secured to this bevel pinion is a friction cup 33, which is adapted to coöperate with the cone friction 24.

By reason of the fact that the inner end of the sleeve sections 25 and 26 are provided with the annular shoulders 27 which fit in the annular groove 28, the said sleeve sections are held against longitudinal movement.

To the rear end of shaft 22 is pivoted a lever 34, the end of the lower arm of said lever being pivoted to an arm 35 rigidly connected to and projecting from a depending portion of the supporting frame 13. By turning this lever, it is obvious that the shaft 22 may be slid either forwardly or rearwardly, in accordance with the direction of turning the lever.

Journaled in suitable bearings in the supplemental frame, and disposed at right angles to shaft 22, is a short chain shaft 36, the trunnions 16 being in the same center as said shaft. The inner end of this chain shaft has rigidly mounted thereon a beveled gear 37 which meshes with the two beveled pinions 30 and 32. Shaft 36 has also keyed thereon a double sprocket wheel, one sprocket member 38 thereof having a sprocket chain 39 passing therearound, said sprocket chain leading to and passing around a sprocket wheel 40 on the front axle 10. The other sprocket wheel member 41 has a sprocket chain 42 passing therearound, said sprocket chain leading to a sprocket wheel 43 on the rear axle 11. From the fact that the trunnions 16 are centered with shaft 36, the chains 39 and 42 are never tightened or loosened, notwithstanding movements imparted to the frame by reason of jars or vibrations.

It will be assumed that the engine shaft rotates in the direction indicated by the arrow which is applied to the fly wheel 19 of said shaft. If, now, it is desired that the locomotive shall run forward, the lever 34 is grasped and pushed forwardly, so as to draw the shaft 22 rearwardly. This will bring the friction cone 23 into frictional clutching engagement with the cup 31, and cone 24 out of frictional engagement with the cup 33. Rotation of shaft 22 will through the engagement of cone 23 and cup 31 impart rotation to the sleeve section 25, and the rotation of this sleeve section will be imparted to the beveled gear 37 by reason of the meshing of bevel pinion 30 with said beveled gear. In view of the fact that bevel gear 37 is fast on shaft 36, this shaft is rotated in a forward direction, and consequently the two sprocket chains 39 and 42 are moved so as to turn the front and rear axles forwardly, and thereby cause the locomotive to run in a forward direction.

If it is desired to reverse the direction of travel of the locomotive, the reverse operation takes place, that is to say, the upper end of the lever 34 is grasped and pulled rearwardly. This has the effect of thrusting shaft 22 forward to thereby bring cone 23 out of frictional engagement with cup 31, and cone 24 into frictional engagement with cup 33. This will have the effect of rotating sleeve section 26, which sleeve section, through the meshing of bevel pinion 32 with bevel gear 37 will cause shaft 36 to rotate in a direction toward the rear of the machine, and thereby through the movement imparted to sprocket chains 39 and 42 cause a rearward travel of the locomotive.

We prefer to provide improved forms of bearings for the front and rear axles 10 and 11. These bearings are illustrated in detail in Figs. 6 and 7 of the drawings, and consist of upper and lower sections 43' and 44 respectively, the former being bolted to the sides of the outer frame 9, and the two sections being secured together by means of the bolts 45. These two sections of the bearing box are each provided with a half circular recess, which when the sections are adjusted together form a circular opening in which are placed the two semi-circular bearings 46, 46, which semi-circular bearings are also of oval form in the direction of the length of the axle, the recesses in the bearing box sections 43 and 44 being similarly formed, as most cleary shown in Fig. 6. By this described form of bearing, when the wheels pass over uneven places in the track a rocking motion is permitted, which allows the wheel and axle to move up or down, to thereby compensate for such unevenness. In order to prevent rotation of the semi-circular bearing sections 46, while yet at the same time allowing for the free up and down movement of the wheel and axle, we provide each bearing section 46 with an elongated recess 47, the length of said recess being in the direction of the length of the axle. A small pin 48 is passed through an opening in the upper bearing box section 43, and the lower end of this pin fits in said recess 47. From this construction, it will be evident that the upper bearing section 46 is prevented from rotating on the shaft, while at the same time the rocking movement of said bearing section with the shaft is not interfered with.

Fig. 8 of the drawings illustrates a modified form of the reversing mechanism, whereby the locomotive is made capable of travel forward at a fast and slow speed, and also capable of traveling rearwardly at the same fast and slow speed. In this form the shaft 22, and the sleeve sections 25 and 26 are arranged exactly as in the other form of construction, that is to say, the sleeve section 25 is provided with the bevel pinion 30 in mesh with the bevel gear 37 on shaft 36, said bevel pinion having the cup 31 rigid thereto, the said cup adapted to coöperate with the cone friction 23; and the sleeve section 26 being provided with the bevel pinion 37, and also having the cup 33 rigid thereto and coöperating with the cone friction 24. Shaft 36 also has mounted thereon the two-member sprocket wheel 38—41, for the chains 40 and 42. This two-member sprocket wheel, however, differs from the corresponding part in the other figures of the drawings, in that the modified construction instead of being fast to shaft 36 as in said other construction, is loose thereon, and is also provided with a projecting sleeve 49. Keyed on this projecting sleeve so as to be capable of imparting rotation thereto, and to have a sliding movement thereon, is a gear wheel 50, said wheel being formed on its outer side with one member 51 of a clutch mechanism. Keyed directly on shaft 36 is a small gear wheel 52 provided on its inner side with a clutch member 53 adapted to coöperate with clutch member 51. This wheel 52 is in mesh with an outer gear wheel 54 fast on an auxiliary shaft 55. Auxiliary shaft 55 also has fast thereon another and smaller gear wheel 56 with which the gear wheel 50 may be brought into mesh. For the purpose of sliding wheel 50 on sleeve 49, we provide a lever 57.

It will be assumed that the parts are in the adjustment shown in Fig. 8 of the drawings. If the engine is started, rotation, through the described gearing, is imparted to shaft 36. Rotation of shaft 36 carries with it small gear wheel 52, which gear wheel, being in mesh with gear wheel 54 rotates auxiliary shaft 55, which rotation of shaft 55 of course causes rotation of the smaller gear wheel 56, which gear wheel in turn rotates the larger gear wheel 50, and this gear wheel being feathered on sleeve 49 causes rotation of the two-part sprocket wheel 38—41, and a consequent movement to be imparted to the sprocket chains 39 and 42, and hence the travel of the locomotive is produced. This travel, however, through the described gearing is at a slow speed. If, now, it is desired to cause the travel of the locomotive at a fast speed, in the same direction in which it was traveling at a slow speed, the parts are left at the same adjustment, with the exception of the gear wheel 50. This gear wheel, by properly manipulating the lever 57 is moved longitudinally along sleeve 49, until the clutch member 51 thereof comes into engagement with clutch member 53 of the small gear wheel 52. This has the effect of locking gear wheel 50 to gear wheel 52, and as the latter wheel is fast on shaft 36, direct rotation of the sleeve 49 is produced, and hence a fast speed of the locomotive results. It will of course be understood that when gear wheel 50 is thus caused to move longitudinally on sleeve 49, it is brought out of meshing engagement with the gear wheel 56 and in consequence gear wheels 54 and 56 are, under this adjustment idle, or non-effective. These two speeds, viz, slow and fast, may of course be given to the locomotive when said locomotive is either traveling forwardly or rearwardly, which forward or rearward travel is produced by the proper adjustment of the shaft 22, so as to bring either the cone 23 or 24 into operative engagement with the cups 31 and 33.

It will be understood, of course, that if desired varying reductions in speed may be secured by employing an additional gear wheel, or additional gear wheels.

What we claim as our invention is:

1. A traveling device, comprising an outer frame, an inner frame, a motor and its operated mechanism mounted on the inner frame, a horizontal shaft forming part of said mechanism, an operating connection between the horizontal shaft and the traction wheels of the device, pivotal connections between the sides of the inner frame and the outer frame and in axial alinement with but extending longitudinally beyond the horizontal shaft of the operated mechanism, and a pivotal connection between one end of the inner frame and the outer frame and positioned axially at right angles horizontally to the axial line of the pivotal connections.

2. A traveling device, comprising an outer frame, an inner frame, a motor and its operated mechanism mounted on the inner frame, a horizontal shaft forming part of said mechanism, an operating connection between the horizontal shaft and the traction wheels of the device, trunnions projecting transversely from the inner frame and in axial alinement with but extending longitudinally beyond the horizontal shaft of the operated mechanism, bearings on said outer frame in which the trunnions have their bearings, a transverse spring connected to the outer frame, and a pivotal connection between one end of the inner frame and the transverse spring and positioned axially at right angles horizontally to the axial line of the trunnions.

3. In a self propelled traveling device, the combination of a frame, axles journaled in bearings in the frame, said axles having traction wheels mounted thereon and each axle having a belt wheel mounted thereon, engine mechanism mounted on the frame, a slidably mounted reversing shaft rotated by the shaft of the engine mechanism, friction wheels fast on the reversing shaft and spaced a distance apart thereon, sleeve sections surrounding the reversing shaft, each sleeve section provided at its outer end with a rigid gear wheel and with a rigid friction wheel, the latter coöperating with the adjacent friction wheel of the reversing shaft, when said shaft is adjusted longitudinally in either direction to bring one or the other sets of friction wheels into engagement, a power transmitting shaft having belt wheels mounted thereon and adapted to be rotated thereby, said shaft provided at its inner end with a gear wheel meshing with the two gear wheels of the respective sleeve sections, and belts passing around the belt wheels of the power transmitting shaft, one of said belts leading to and around the belt wheel of the forward axle, and the other of said belts leading to and around the belt wheel of the rear axle.

4. In a self propelled traveling device, the combination of a frame, front and rear axles journaled in the frame, said axles having traction wheels mounted thereon, and each axle having a belt wheel mounted thereon, engine mechanism mounted on the frame, a slidably mounted reversing shaft rotated by the shaft of the engine mechanism, friction wheels fast on the reversing shaft and spaced a distance apart thereon, sleeve sections surrounding the reversing shaft, each sleeve section provided at its outer end with a rigid gear wheel and with a rigid friction wheel, the latter coöperating with the adjacent friction wheel of the reversing shaft, when said shaft is adjusted longitudinally in either direction to bring one or the other sets of friction wheels into engagement, a power transmitting shaft having a two-member belt wheel mounted loosely thereon, said two member belt wheel provided with a projecting sleeve, a gear wheel rotatable with but slidable on the sleeve, a gear wheel mounted fast on the power transmitting shaft, an auxiliary shaft having a large gear wheel mounted thereon in mesh with the smaller gear wheel of the power transmitting shaft, and also having a small gear wheel thereon with which the gear wheel of the sleeve is adapted to be brought into meshing engagement, and belts passing around the members of the belt wheel which are loose on the power transmitting shaft, one of said belts passing to and around the belt wheel on the forward axle, and the other of said belts passing to and around the belt on the rear axle.

5. In a vehicle, the combination with a frame, of an axle beneath the frame, wheels on opposite ends of the axle, and a bearing box for each end of the axle, each bearing box consisting of a box having a circular opening, the bordering edge of said circular opening being of an oval shape in a transverse plane, a sleeve fitting in said box and surrounding the shaft, the periphery of said sleeve being also of oval shape in a transverse plane to fit the correspondingly shaped bordering edge of the opening of the box, and a pin passing through a pin opening in the box and entering a transversely elongated recess in the sleeve.

6. In a traveling device, the combination of an outer frame, axles journaled in bearings in said frame, said axles having traction wheels mounted thereon, and each axle having a belt wheel mounted thereon, an inner frame connected at its forward end to the outer frame by a horizontal pivot, and having trunnions projecting laterally from its opposite side edges and engaging the sides of the outer frame, engine mechanism mounted on the inner frame, a slidably mounted reversing shaft rotated by the shaft of the engine mechanism, friction wheels fast on the reversing shaft and spaced a distance apart thereon, sleeve sections surrounding the reversing shaft, each sleeve section provided at its outer end with a rigid gear wheel and with a friction wheel, the latter coöperating with the adjacent friction wheel of the reversing shaft, when said shaft is adjusted longitudinally in either direction to bring one or the other sets of friction wheels into engagement, a power transmitting shaft having belt wheels mounted thereon and adapted to be rotated thereby, said shaft provided at its inner end with a gear wheel meshing with the two gear wheels of the respective sleeve sections, and belts passing around the belt wheels of the power transmitting shaft, one of said belts leading to and around the belt wheel of the forward axle, and the other of said belts leading to and around the belt wheel of the rear axle.

7. In a traveling device, the combination of an outer frame, axles journaled in bearings in said outer frame, said axles having traction wheels mounted thereon, and each axle having a belt wheel mounted thereon, an inner frame connected at its forward end to the outer frame by a horizontal pivot, and having trunnions projecting laterally from its opposite side edges and engaging the sides of the outer frame, engine mechanism mounted on the inner frame, a slidably mounted reversing shaft rotated by the shaft of the engine mechanism, friction wheels fast on the reversing shaft and spaced a distance apart thereon, sleeve sections surrounding the reversing shaft, each sleeve section provided at its outer end with a rigid gear wheel and with a friction wheel, the latter coöperating with the adjacent friction wheel of the reversing shaft, when said shaft is adjusted longitudinally in either direction to bring one or the other sets of friction wheels into engagement, a power transmitting shaft at right angles to the reversing shaft and centered with respect to the laterally projecting trunnions of the inner frame, said power transmitting shaft having belt wheels mounted thereon and adapted to be rotated thereby, and said shaft provided at its inner end with a gear wheel meshing with the two gear wheels of the respective sleeve sections, and belts passing around the belt wheels of the power transmitting shaft, one of said belts leading to and around the belt wheel of the forward axle, and the other of said belts leading to and around the belt wheel of the rear axle.

In testimony whereof, we affix our signatures, in presence of two witnesses.

FREDERICK P. COOK.
ADOLPH N. MILLER.

Witnesses:
A. L. MORSELL,
ANNA F. SCHMIDTBAUER.